United States Patent [19]

Bose et al.

[11] Patent Number: 5,023,917
[45] Date of Patent: Jun. 11, 1991

[54] METHOD AND APPARATUS FOR PATTERN INSPECTION

[75] Inventors: Chinmoy B. Bose, Green Brook; Rajarshi Ray, Princeton, both of N.J.

[73] Assignee: AT&T Bell Laboratories, Murray Hill, N.J.

[21] Appl. No.: 232,033

[22] Filed: Aug. 15, 1988

[51] Int. Cl.$^5$ .............................................. G06K 9/00
[52] U.S. Cl. ........................................ 382/8; 358/106
[58] Field of Search ............................ 382/8; 358/106

[56] References Cited

U.S. PATENT DOCUMENTS

4,668,982 5/1987 Tinnerino .......................... 358/101

Primary Examiner—Michael Razavi
Assistant Examiner—Daniel Santos
Attorney, Agent, or Firm—Robert B. Levy

[57] ABSTRACT

Accurate inspection of a pattern (14) of metallized areas (12) printed on a substrate (10) is accomplished by compensating the pattern for any deformation prior to comparing the image thereof to that of a perfect (master) pattern (14'). The amount of compensation is determined by first capturing the image of selected elements in the pattern with the aid of a television camera (32). A machine vision processor (36) processes the output of the camera (32) to determine the offset of each of the selected elements in the pattern from the corresponding elements within a master pattern (14') which represents a perfectly formed version of the actual pattern (14). From the amount of offset between the selected elements in the pattern (14) and the corresponding elements in the master pattern (14'), the amount of pattern deformation at the preselected elements, as well as at all intermediate sites, is determined and the pattern is compensated accordingly.

5 Claims, 4 Drawing Sheets

MASTER

METHOD AND APPARATUS FOR PATTERN INSPECTION

TECHNICAL FIELD

This invention relates generally to a method and apparatus for automatically inspecting a pattern on a surface.

BACKGROUND ART

There is presently a trend in the electronics industry towards fabricating circuits having increased functionality and reduced size. This trend has led to the development of Hybrid Integrated Circuits (HICs) which are comprised of a multilayer ceramic substrate having a plurality of metallized pads on one or both of its exposed surfaces (i.e., the outer layers of the substrate). Each pad is typically solder bonded to a terminal on an electrical component, which may be an "active" device, such as an integrated circuit, or a "passive" device, such as a resistor or capacitor. The pads are selectively interconnected by metallized paths on the outer substrate layer, which are typically an order of magnitude thinner than those on a conventional printed circuit board. The metallized paths are selectively interconnected by a set of "cross-under" connecting areas on an underlying substrate layer. The narrowness of the metallized paths, together with the interconnection of the paths provided by the cross-under connecting areas, affords the HIC a very high circuit density.

The multilayer HIC substrate is fabricated by first screen printing one or more patterns of cross-under connecting areas (often referred to as circuits) on one or both surfaces of a ceramic plate. This is typically accomplished by placing a stencil, having one or more patterns of openings, each corresponding to the desired pattern of cross-under connecting areas, in registration with the plate surface. A metallic paste, typically made from gold, is forced through the stencil openings for deposit on the surface at the locations where the cross-under connecting areas are desired. After the paste has been deposited, the substrate is fired so the paste adheres thereto. Next, an insulator, typically a layer of glaze, is deposited onto the pattern(s) of cross-under connecting areas so that selected portions of each cross-under area remain exposed. A thin layer of metal, typically copper, is then sputtered onto the glaze layer. Thereafter, the copper is patterned, usually by the process of photolithography, to produce the desired pattern of pads and connecting paths.

As may be appreciated, in order for the HIC to operate properly, each metallized path on the glaze layer must be in aligned contact with one or more selected cross-under connecting areas on the layer therebeneath. Otherwise, the paths will not be properly connected by the cross-under connecting areas. To insure proper alignment, the cross-under connecting areas are screen printed onto each surface of the plate together with a set of fiducial marks (fiducials) which are then used to align the pattern of pads and paths to the pattern of cross-under areas.

In order to assure high quality, as well as to reduce the cost of scrap during manufacture, the patterns of cross-under connecting areas on the plate are each inspected for defects prior to deposition of the glaze layer. Presently, such inspection is accomplished automatically with a machine vision system which captures the image of each actual pattern and compares it to the image of a master pattern which corresponds to the actual pattern when it is perfectly formed. If there is a substantial match between the images of the actual and master patterns, then the actual pattern is deemed to be "good." Should no match occur, then the actual pattern is deemed to be "bad."

Difficulties can arise if the pattern to be inspected is deformed due to deformation of the stencil during printing of the pattern on the substrate. The term "deformed" is used generically to describe both stretching (where the pattern is misshaped along a coordinate axis) as well as shearing (where the pattern is misshaped orthogonal to a coordinate axis). Even if the actual pattern is deformed by only a small amount which is within manufacturing tolerances, the image of the actual pattern, when compared to the image of the master pattern, will likely be offset and thus will not match. As a result, present day inspection techniques tend to incur the disadvantage of a high "false reject" rate, i.e., a high rate of rejection of patterns which are within manufacturing tolerances.

Thus, there is a need for a technique for inspecting a pattern on a substrate which compensates for small amounts of pattern deformation.

BRIEF SUMMARY OF THE INVENTION

Briefly, in accordance with the invention, a pattern is automatically compensated for deformation by first training an image acquisition device (e.g., a television camera) on the pattern to capture the image of selected portions thereof. From the portions of the image of the pattern that are captured, the amount by which the pattern is deformed is determined. Typically, the amount of deformation is determined from the difference in position between each of a set of predetermined locations within the captured image, and the corresponding locations in the image of a master pattern which corresponds to a "perfect" actual pattern. Once the amount of deformation has been determined, the pattern under inspection is compensated accordingly. Typically, this is done by shifting the pattern laterally (i.e., in a direction perpendicular to the optical axis of the camera) in accordance with the amount of the deformation to obtain positional correspondence with the master pattern.

Once compensated, the actual pattern can be inspected by acquiring the image thereof and comparing it to the image of the master pattern. A substantial match between the two images indicates that the actual pattern is good. If no match occurs, then the actual pattern is bad.

DETAILED DESCRIPTION

Figure 1:
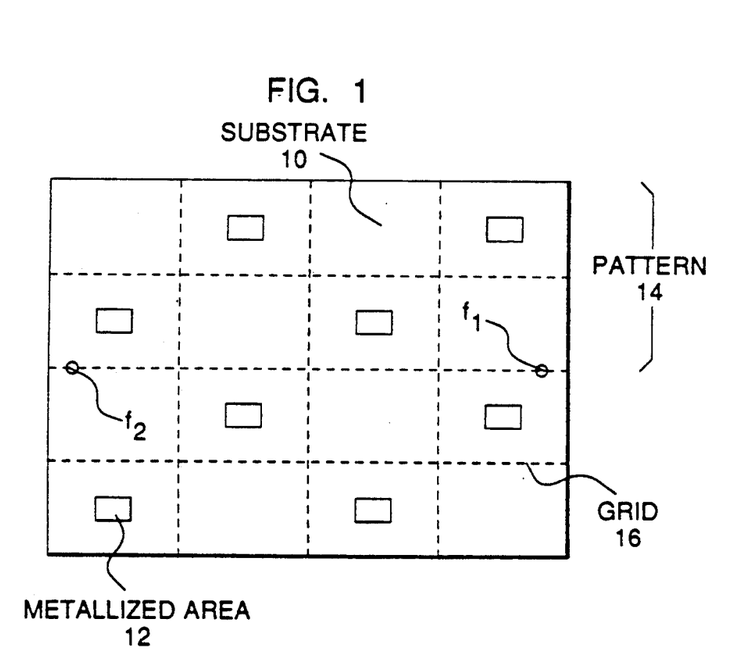
FIG. 1 is a plan view of a substrate having a plurality of metallized areas thereon arranged in a particular pattern.

FIG. 1 is a plan view of substrate 10 which has a plurality of metallized areas 12 arranged on a major surface thereof in a pattern 14. While the metallized areas 12 are depicted as equal size rectangles, in practice they may appear more as thin strips, typically 10 mils (0.25 mm) in width, and various lengths. In addition to the metallized areas 12, the pattern 14 may also include two reference marks or fiducials $f_1$ and $f_2$ which are used for aligning subsequent patterns (not shown) printed on the substrate 10. In a preferred embodiment, the substrate 10 takes the form of a ceramic plate of the type to make HICs, and the pattern 14 of metallized areas 12 corresponds to a pattern of cross-under connecting areas on the HIC, often referred to as a "circuit." A typical HIC will have several such patterns 14 in spaced relationship.

Typically, the pattern 14 of the metallized areas 12 and fiducials $f_1$ and $f_2$ is screen printed on the surface of the substrate 10 by placing a stencil (not shown), having a pattern of openings arranged the same as the pattern, in registration with the substrate 10. A paste (not shown), typically made from a highly electrically conductive metal such as gold or the like, is forced through the openings in the stencil for deposit on the substrate 10. Thereafter, the substrate 10 is fired so the paste adheres to the substrate, thereby establishing the pattern 14 of the metallized area 12 and the fiducials $f_1$ and $f_2$.

Under ideal conditions, the metallized areas 12 are screen printed on the substrate 10 so that each lies at a predetermined location (within a separate row and column) of an imaginary grid 16 comprised of uniformly spaced vertical and horizontal lines (shown in phantom). In the embodiment illustrated in FIG. 1, each metallized area 12 is centrally located within a separate one of the rows and columns of the grid 16 so that the pattern 14 appears as a checkerboard. It should be understood that the metallized areas 12 could be arranged differently within the grid 16 so that the pattern 14 would have a different appearance.

Figure 2:
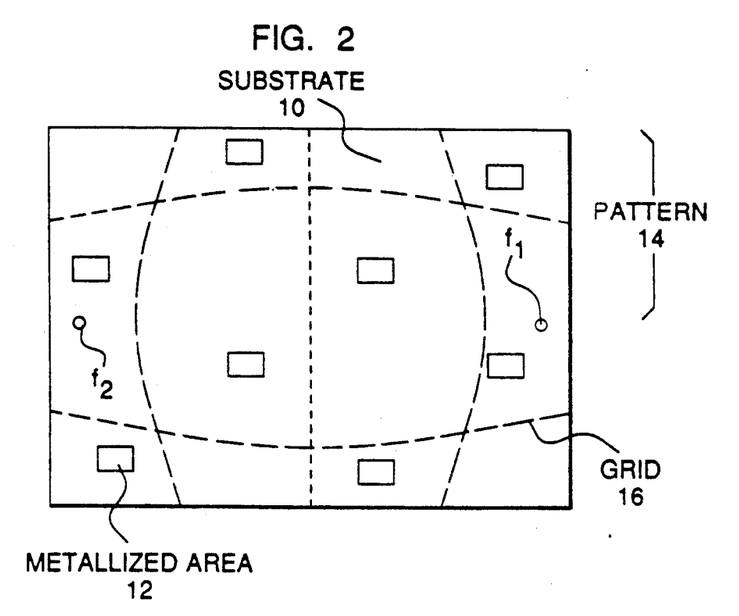
FIG. 2 is an example of the pattern of metallized areas of FIG. 1 after deformation.

Referring to FIG. 2, in the course of printing the pattern 14 on the substrate 10, there is often some deflection of the stencil, causing the pattern to become deformed. The deformation of the pattern 14 is represented in FIG. 2 by the deformation of the grid 16 and the non-uniform spacing of the metallized areas 12 within the rows and columns thereof. The amount of deformation of the pattern 14 in FIG. 2 has been exaggerated for purposes of illustration.

Figure 3:
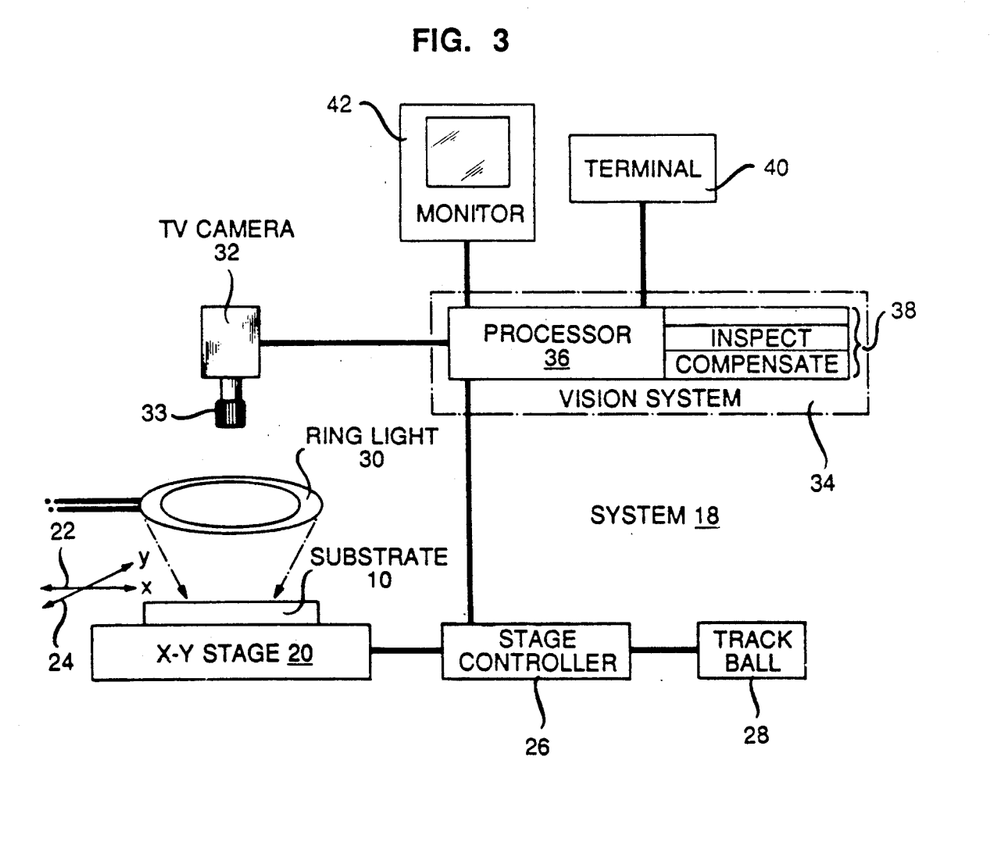
FIG. 3 is a block schematic diagram of a system for inspecting the pattern of metallized areas of FIGS. 1 and 2 in accordance with the present invention.

In practice, small amounts of deformation of the pattern 14 can be tolerated in production. However, as previously indicated, present day pattern inspection techniques are generally intolerant of any deformation of the pattern 14. As a result, such techniques incur the disadvantage of a high "false reject" rate (i.e., a high rate of rejection of those patterns 14 that are acceptable). Referring now to FIG. 3, there is shown a schematic block diagram of an inspection system 18, in accordance with the invention, which compensates for deformation of the pattern 14 prior to actually inspecting it. The system 18 comprises a motorized x-y stage 20 which supports the substrate 10. Means (not shown) in the form of a three-pin snugger mechanism are carried by the stage 20 for clamping the substrate 10.

The stage 20 moves the substrate 10 in precise increments along x and y axes 22 and 24, respectively, under the control of a stage controller 26. A track-ball input device 28 is coupled to the stage controller 24 to enable the stage 20 to be operated under manual control. In addition, the stage controller 24 is responsive to a set of electronic control signals supplied thereto in a manner described hereinafter and serves to control the stage 20 in accordance with such control signals.

Above the stage 20 is a ring lamp 30 for illuminating the substrate 10. A television camera 32, typically of the Charge-Coupled Device (CCD) type, is located above the ring lamp 30 so as to be trained on the substrate 10 such that the optical axis of the camera is substantially perpendicular to the plane of the substrate. On the camera 32 is a lens 33 whose optical properties are selected so that the camera has a very small field of view, typically on the order of $0.25'' \times 0.25''$ (6.35 mm $\times$ 6.35 mm) in order to increase the image resolution. In practice, the overall size of the pattern 14 is often larger than the field of view of the camera 32 so that only a portion of the pattern will appear therein. Thus, to capture the entire image of the pattern 14, it is necessary to successively displace or step the substrate 10 laterally relative to the camera 32.

The camera 32 supplies an analog output signal, varying in accordance with the intensity of the image captured thereby, to a machine vision system 34, which typically takes the form of an IRI model P-256 system, available from IRI Corporation, Carlsbad, Calif. The machine vision system 34 is comprised of a processor 36 (typically a Motorola 68000 microprocessor) which is coupled to a memory 38. The memory 38 serves to store image data of the pattern 14 captured by the camera 32. Also, the memory 38 serves to store data supplied thereto indicative of the locations of the metallized areas 12 within the pattern 14, as well as reference data for comparison against actual image data, descriptive of the metallized areas being inspected. Further, the memory 38 stores a pair of program modules COMPENSATE and INSPECT. As will be described, the COMPENSATE program module, when executed, causes the processor 36 to first determine the amount of deformation of the pattern 14 and thereafter compensate the pattern. The INSPECT module, when executed, causes the processor 36 to inspect the pattern 14 for defects.

The processor 36 is coupled to the stage controller 26, and serves to supply the stage controller with electronic control signals to control the movement of the stage 20 as well as to receive signals from the stage controller indicative of the position of the stage. Further, the processor 36 is coupled to an input/output device 40 which typically takes the form of a cathode ray tube or video display type terminal which allows an operator to enter data to, and to see data output by, the processor. Additionally, a video monitor 42 may be coupled to the processor 36 to display the image of the substrate 10 captured by the camera 32.

Figure 4:
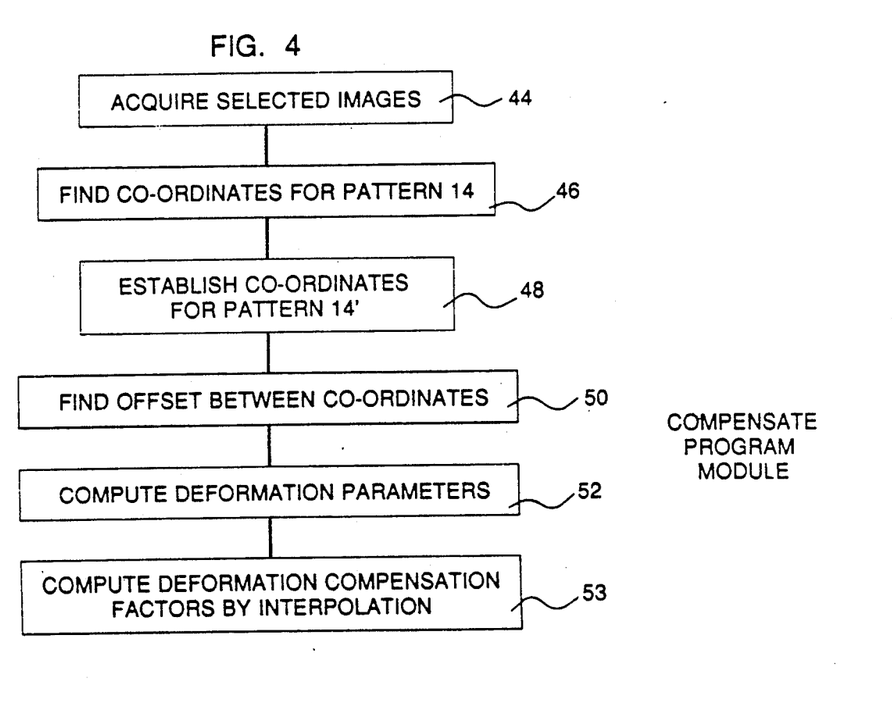
FIG. 4 is a flow chart representation of a computer program module (COMPENSATE) executed by the inspection system of FIG. 3.

To accomplish inspection of the pattern 14, the processor 36 first excutes the COMPENSATE routine to determine the amount of deformation of the pattern 14 of FIG. 2, so that the processor can establish how much the pattern is to be compensated (corrected) before inspection. Referring now to FIG. 4, which is a flow chart representation of the COMPENSATE program module, the first task performed by the processor 36 of FIG. 3 is the acquisition of selected portions of the image of pattern 14 of FIG. 2 (step 44). In this regard, reference should be made to FIG. 5 which illustrates the pattern 14 of FIG. 2 with only the lower left, lower right, upper left and upper right metallized areas 12, designated as $12^{11}$, $12^{22}$, $12^{33}$, $12^{44}$, respectively, and the fiducials $f_1$ and $f_2$ being depicted. During step 44 of FIG. 4, only the image of the lower left corner of the metallized areas $12^{11}$, $12^{22}$, $12^{33}$, and $12^{44}$ and the image of the fiducials $f_1$ and $f_2$ are captured. As may be appreciated, the lower metallized areas $12^{11}$, $12^{22}$, $12^{33}$, and $12^{44}$, respectively, correspond to the outermost elements of the pattern 14.

Figure 5:
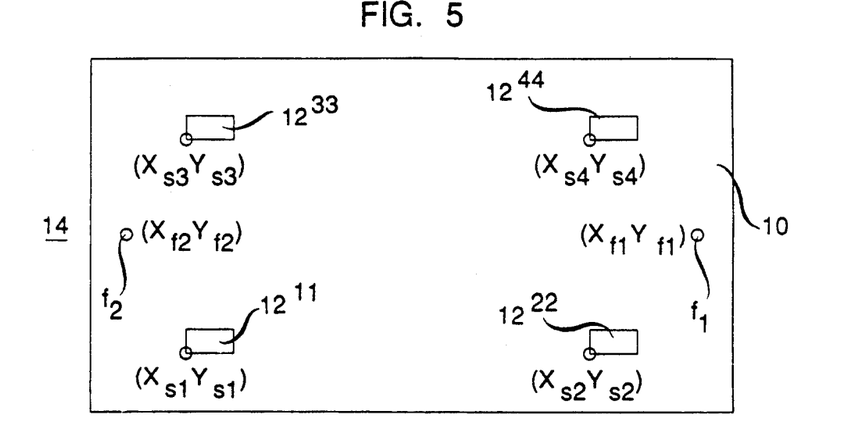
FIG. 5 is a simplified version of the pattern of FIG. 2 with only selected metallized areas in the pattern being depicted.

Acquisition of these selected images is accomplished by displacing the stage 20 to successively bring each of the fiducials $f_1$ and $f_2$ and each of the metallized areas $12^{11}$, $12^{22}$, $12^{33}$, and $12^{44}$ into the field of view of the camera 32. When the pattern 14 is deformed, the exact position of each of the fiducials $f_1$ and $f_2$ and each of the metallized areas $12^{11}$, $12^{22}$, $12^{33}$, and $12^{44}$ will not be exactly at the location where the processor 36 knows them to be from the data stored in the memory 38 at the outset of operation. However, it is sufficient to successively displace the substrate 10 so that the centroid of the field of view of the camera 32 corresponds to the expected centroid of the image to be captured. Typically, the deformation of the pattern 12 is relatively small, so that the desired image is usually somewhere within the field of view of the camera 32.

When the desired image, for example, the image of the fiducial $f_1$, is in the field of view of the camera 32, the output signal of the camera will vary in accordance with the intensity of the light reflected from the fiducial and from the surrounding area. As described, the fiducials $f_1$ and $f_2$ and all of the metallized areas 12 (including $12^{11}$, $12^{22}$, $12^{33}$, and $12^{44}$) are printed onto the substrate 10 with gold paste and therefore tend to be very specular, thus giving rise to a very high intensity value. In contrast, the area on the substrate 10 surrounding each of the fiducials $f_1$ and $f_2$ and each of the metallized areas $12^{11}$, $12^{22}$, $12^{33}$, and $12^{44}$ is diffuse and reflects less light, giving rise to a relatively lower light intensity value. From the difference in the intensity values, the processor 36 can locate those areas within the image of the pattern 14 which are very specular (i.e., the fiducials $f_1$ and $f_2$ and the metallized areas $12^{11}$, $12^{22}$, $12^{33}$, and $12^{44}$) when the output signal of the camera 32 is processed. During the process of acquiring the selected images, the processor 36 of FIG. 3 converts the output signal of the camera 32 into a stream of data blocks (bytes), each representing the light intensity reflected from a small area (pixel) within a 256×240 array comprising the image captured by the camera. Each pixel typically corresponds to an area 0.001" by 0.001" (0.025 mm by 0.025 mm).

Once the images of the fiducials $f_1$ and $f_2$ and the image of the lower left corner of each of the metallized areas $12^{11}$, $12^{22}$, $12^{33}$ and $12^{44}$, respectively, have been acquired, then the processor 36 ascertains the coordinates of the centroid of each of these images (step 46). Typically, the vision system 34 is calibrated at the outset of operation so that as stage 20 moves, the location (i.e., the coordinates) of the centroid of the field of view of the camera 32 is known to the processor 36. Knowing the location of the centroid of the field of view of the camera 32 allows the processor 36 to establish the coordinates of the images captured during step 46. The coordinates for the centroid of the image of each of the fiducials $f_1$ and $f_2$ are given by $(x_{f1}, y_{f1})$ and $(x_{f2}, y_{f2})$, respectively. The coordinates of the centroid of the image of the lower left corner of each of the metallized areas $12^{11}$, $12^{22}$, $12^{33}$ and $12^{44}$, respectively, are given by $(x_{s1}, y_{s1})$, $(x_{s2}, y_{s2})$, $(x_{s3}, y_{s3})$ and $(x_{s4}, y_{s4})$, respectively.

The coordinate values established during step 46 of FIG. 4 do not themselves provide sufficient information to enable the processor 36 of FIG. 3 to determine the amount of deformation of the pattern 14 of FIG. 2. In order to determine the amount of deformation of the pattern 14, the processor 36 utilizes the reference data provided to it at the outset of operation to make a comparison with the coordinate data obtained during step 46. To this end, reference should be made to FIG. 6, which illustrates a master pattern 14' comprised of a plurality of metallized areas 12' (only the areas $12'^{11}$, $12'^{22}$, $12'^{33}$, and $12'^{44}$ being shown) and a pair of fiducials $f_1'$ and $f_2'$. The arrangement of the metallized areas 12' in the master pattern 14' represents the desired arrangement for the metallized areas 14 in the pattern 12 of FIG. 5 when the latter is perfectly formed. In other words, the master pattern 14' can be said to be a "perfect" version of the actual pattern 14 of FIG. 5. It is the master pattern 14' (actually a set of data elements representing the master pattern) which serves as the standard by which the processor 36 determines the amount by which the pattern 14 of FIG. 2 is deformed.

To determine the amount by which the pattern 12 is deformed (using the master pattern 14' as the standard), the processor 36 executes step 48 of FIG. 4 and establishes the coordinates of the centroid of the images of the fiducials $f_1'$ and $f_2'$ of the lower left corner of each of the metallized areas $12'^{11}$, $12'^{22}$, $12'^{33}$ and $12'^{44}$ in the master pattern. The coordinates of the centroid of the image of each of the fiducials $f_1'$ and $f_2'$ and the lower left corner of each of the metallized areas $12'^{11}$, $12'^{22}$, $12'^{33}$ and $12'^{44}$ are given by $(x_{f1}', y_{f1}')$, $(x_{f2}', y_{f2}')$, $(x_{s1}', y_{s1}')$, $(x_{s2}', y_{s2}')$, $(x_{s3}', y_{s3}')$, and $(x_{s4}', y_{s4}')$, respectively. The values for $(x_{f1}', y_{f1}')$, and $(x_{f2}', y_{f2}')$, $(x_{s1}', y_{s1}')$, $(x_{s2}', y_{s2}')$, $(x_{s3}', y_{s3}')$, and $(x_{s4}', y_{s4}')$ are typically stored in the memory 38 at the outset of operation.

Figure 6:
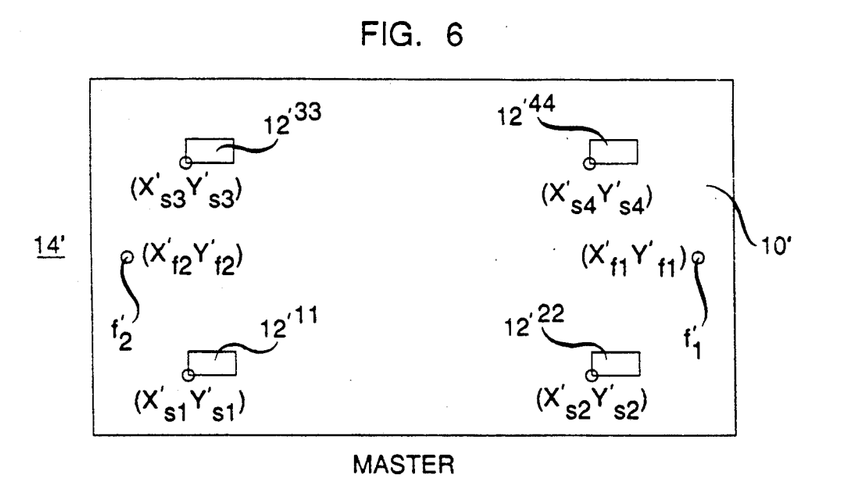
FIG. 6 illustrates a master pattern of metallized areas, with only selected areas (corresponding to those in FIG. 4) being depicted.

Following step 48 of FIG. 4, the processor 36 of FIG. 3 executes step 50 in the COMPENSATE program module to determine the offset between the fiducials $f_1$ and $f_2$ in the pattern 14 of FIG. 4 and the fiducials $f_1'$ and $f_2'$ in the master pattern 14' of FIG. 6, respectively. The amount by which the fiducial $f_1$ is offset (in both x and y) from the fiducial $f_1'$ (hereinafter defined by the terms $\Delta x_1$ and $\Delta y_1$) is given by equations (1) and (2).

$$\Delta x_1 = x_{f1} - x_{f1}' \qquad (1)$$

$$\Delta y_1 = y_{f1} - y_{f1}' \qquad (2)$$

Similarly, the x and y offsets, (defined as $\Delta x_2$ and $\Delta y_2$) of the fiducial $f_2$ from the fiducial $f_2'$ are given by equations (3) and (4).

$$\Delta x_2 = x_{f2} - x_{f2}' \qquad (3)$$

$$\Delta y_2 = y_{f2} - y_{f2}' \qquad (4)$$

After computing the offsets, the processor 36 determines a set of deformation parameters which reflect the amount of pattern deformation (step 52). In practice, the gross deformation of the pattern 14 is characterized by the difference in the distance (i.e., the offset) between the fiducials $f_1$ and $f_2$, and the fiducials $f_1'$ and $f_2'$ and by the difference in the distance between the metallized areas $12^{11}$, $12^{22}$, $12^{33}$, and $12^{44}$ and the metallized areas $12'^{11}$, $12'^{22}$, $12'^{33}$, and $12'^{44}$, respectively. To determine the gross deformation of the pattern 14, first, the processor 36 determines the amount $S^{fx}$ and $S^{fy}$ by which each of the fiducials $f_1$ and $f_2$ is offset along the x and y axis from a separate one of the fiducials $f_1'$ and $f_2'$, respectively. The amounts $S^{fx}$ and $S^{fy}$ are given by equations (5) and (6).

$$S^{fx} = \Delta x_1 - \Delta x_2 \qquad (5)$$

$$S^{fy} = \Delta y_1 - \Delta y_2 \qquad (6)$$

The magnitude of the offset between the metallized patterns $12^{33}$ and $12^{44}$ in the pattern 14 of FIG. 4 is represented by the term $S^t$ which is given by eq. (7).

$$S^t = (x_{s4} - x_{s3}) - (x_{s4}' - x_{s3}') \qquad (7)$$

In a similar fashion, the magnitudes of the offset between the metallized areas $12^{11}$ and $12^{22}$, $12^{33}$ and $12^{11}$ and $12^{44}$ and $12^{22}$, represented by the terms $S^b$, $S^l$ and $S^r$, respectively, are given by eqs. (8), (9) and (10).

$$S^b = (x_{s2} - x_{s1}) - (x_{s2}' - y_{s1}') \qquad (8)$$

$$S^l = (y_{s3} - y_{s1}) - (y_{s3}' - y_{s1}') \qquad (9)$$

$$S^r = (y_{s4} - y_{s2}) - (y_{s4}' - y_{s2}') \qquad (10)$$

In the practice, a small amount of deformation of the pattern 14 is acceptable. The actual deformation tolerance is based on various factors, including the width of the metallized areas 12 and the density of the pattern 14. Usually, if the deformation parameters $S^{fx}$, $S^{fy}$, $S^t$, $S^b$, $S^l$ and $S^r$ are each less than 0.002″ (0.05 mm), then the deformation of the pattern 14 is deemed to be within tolerance limits. If, after computing the deformation parameters $S^{fx}$, $S^{fy}$ $S^t$, $S^b$, $S^l$ and $S^r$, the processor 36 finds that any one of them exceeds the tolerance limit, then the pattern 14 is rejected because of excessive deformation. Otherwise, the processor 36 then proceeds to execute step 53 to compute the deformation compensation factors which are employed to compensate the pattern 14 prior to inspection.

In order to better understand the operations performed by the processor 36 during step 53 of FIG. 4, it is necessary to have an appreciation of the methodology used by the processor 36 of FIG. 3 in inspecting the pattern 14 of FIG. 2. As will become better understood by later reference to the INSPECT program module of FIG. 7, the processor 36 inspects the pattern 14 by matching the image of each of the metallized areas 12 in FIG. 2 to the corresponding area 12′ in the master pattern 14′ of FIG. 6. However, as indicated, the camera 32 of FIG. 3 has a relatively small field of view, typically much smaller than that of the entire pattern 14. Therefore, to capture the entire image of the pattern 14, it is necessary to successively displace or step the substrate 10 laterally (i.e., perpendicular to the optical axis of the camera 32).

As indicated, at the outset of operation, the system 18 is calibrated so that as the stage 20 moves, the coordinates of the centroid of the image captured by the camera 32 are known by the processor 36. The actual position of each metallized area 12 relative to the centroid of the field of view of the camera 32 can be determined by virtue of the high intensity value associated therewith. When the pattern 14 is deformed, the actual position of the metallized area 12 to be inspected will likely differ from the position where the processor 36 expects the metallized area to be. Thus, the metallized area 12 to be inspected will likely not be aligned with the camera 32 because of deformation of the pattern 14. To achieve accurate inspection of the pattern, the amount of deformation is thus computed so that upon execution of the INSPECT program module, the substrate 10 can be displaced by the proper amount in order to align the camera 36 with the metallized area 12 to be inspected.

Referring to FIG. 4, during step 53 the processor 36 first computes the compensation factors $\Delta x_3$ and $\Delta y_3$ by which the substrate 10 must be displaced along the x and y axes to compensate for deformation, in order to achieve positional correspondence of the area $12^{11}$ with the area $12'^{11}$ in the master pattern 14′. The terms $\Delta x_3$ and $\Delta y_3$ are given by equations (11) and (12).

$$\Delta x_3 = x_{s1} - x_{s1}' \qquad (11)$$

$$\Delta y_3 = y_{s1} - y_{s1}' \qquad (12)$$

To simplify the process of compensating for deformation of the pattern 14, it is useful to consider the lower left corner of the metallized pattern $12^{11}$ as the origin of the pattern space. In this way, the origin of the pattern 14 of FIG. 5 will be registered with that of the master pattern 14′ of FIG. 6.

In order to compute the compensation factor associated with each of the other locations on the substrate to which the camera 36 is moved (i.e., the location of each of the other metallized areas 12), the distance of each of the metallized areas $12^{22}$, $12^{33}$, and $12^{44}$ from the metallized area $12^{11}$ must be computed. The relative distances $D_x^{12}$, $D_x^{24}$, $D_x^{13}$, $D_x^{34}$, $D_y^{12}$, $D_y^{24}$, $D_y^{13}$ and $D_y^{34}$ along the x and y axes, respectively, between the metallized areas $12^{11}$, $12^{22}$, $12^{33}$ and $12^{44}$ are given by:

$$D_x^{12} = x_{s2} - x_{s1} \qquad (13)$$

$$D_x^{24} = x_{s4} - x_{s2} \qquad (14)$$

$$D_x^{13} = x_{s3} - x_{s1} \qquad (15)$$

$$D_x^{34} = x_{s4} - x_{s3} \qquad (16)$$

$$D_x^{12} = y_{s2} - y_{s1} \qquad (17)$$

$$D_y^{24} = y_{s4} - y_{s2} \qquad (18)$$

$$D_y^{13} = y_{s3} - y_{s1} \qquad (19)$$

$$D_y^{34} = y_{s4} - y_{s3} \qquad (20)$$

The distances $D_x^{12}$, $D_x^{24}$, $D_x^{13}$, $D_x^{34}$, $D_y^{12}$, $D_y^{24}$, $D_y^{13}$ and $D_y^{34}$ are influenced by the rotation of the pattern 14 as well as any deformation thereof. When the pattern 14 is deformed, it is necessary to compensate the pattern, i.e., determine the lateral offset $S_x$ and $S_y$ between each of the metallized areas 12 and 12′ so that when a particular metallized area is to be inspected, the substrate 10 can be shifted laterally to achieve the desired positional correspondence therebetween. The compensation factors $S_x$ and $S_y$ can be determined by interpolation/extrapolation using eqs. (21-24).

$$S_x = \left[\frac{D_x^{24} - D_x^{13}}{N_x - 1}(P_x - 1) + D_x^{13}\right]\frac{P_y - 1}{N_y - 1} + D_x^{12}\frac{P_x - 1}{N_x - 1} \quad (21)$$

$$= \left[\frac{D_x^{12}}{N_x - 1}\right](P_x - 1) + \left[\frac{D_x^{13}}{N_y - 1}\right](P_y - 1) + \left[\frac{D_x^{24} - D_x^{13}}{(N_x - 1)(N_y - 1)}\right](P_x - 1)(P_y - 1) \quad (22)$$

$$S_y = \left[\frac{D_y^{24} - D_y^{13}}{N_x - 1}(P_x - 1) + D_y^{13}\right]\frac{P_y - 1}{N_y - 1} + D_y^{12}\frac{P_x - 1}{N_x - 1} \quad (23)$$

$$= \left[\frac{D_y^{12}}{N_x - 1}\right](P_x - 1) + \left[\frac{D_y^{13}}{N_y - 1}\right](P_y - 1) + \left[\frac{D_y^{24} - D_y^{13}}{(N_x - 1)(N_y - 1)}\right](P_x - 1)(P_y - 1) \quad (24)$$

where $N_x$ and $N_y$ are the number of columns and rows, respectively, of the metallized area 12 in the grid 16 of FIG. 1, and $P_x$ and $P_y$ are the row and column numbers, respectively, of the metallized area 12 to be inspected. The metallized area $12^{11}$ is deemed to be located in the first row, first column ($N_x=1$, $N_y=1$). These compensation factors $S_x$ and $S_y$ associated for each of the metallized areas 12 are stored in the memory 38 following step 53.

The equations (22) and (24) can be written in a more generalized form to give the compensation factors $S_x$ and $S_y$ for a point (x,y) in the pattern 14 as follows:

$$S_x = \left[\frac{D_x^{12}}{L_x}\right](x) + \left[\frac{D_x^{13}}{L_y}\right](y) + \left[\frac{D_x^{24} - D_x^{13}}{L_xL_y}\right](xy) \quad (25)$$

$$S_y = \left[\frac{D_y^{12}}{L_x}\right](x) + \left[\frac{D_y^{13}}{L_y}\right](y) + \left[\frac{D_y^{24} - D_y^{13}}{L_xL_y}\right](xy) \quad (26)$$

where $L_x$ is the distance along the x axis between the centroid of the images of the metallized areas $12'^{11}$ and $12'^{22}$; and where $L_y$ is the distance along the y axis between the centroid of the metallized areas $12'^{11}$ and $12'^{33}$. Using equations (25) and (26) eliminates the more cumbersome matrix format employed by equations (22) and (24).

Figure 7:
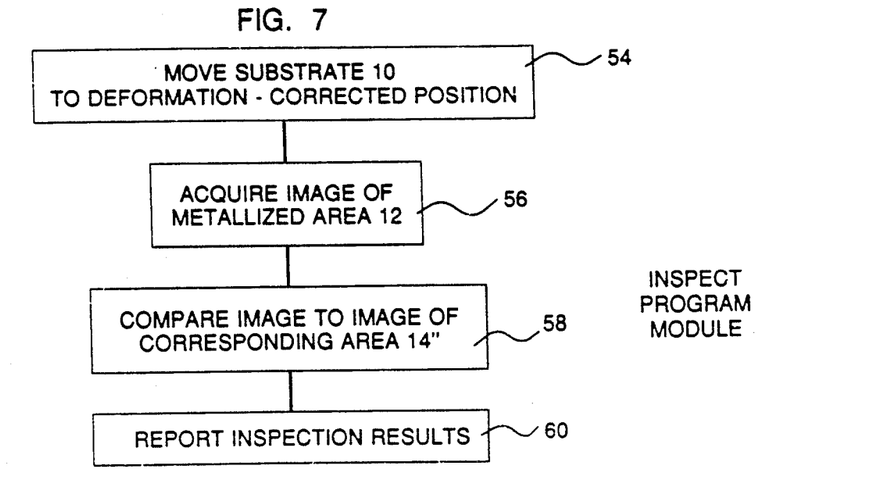
FIG. 7 is a flow chart representation of another computer program module (INSPECT) executed by the system of FIG. 3.

Once the processor 36 has completed computation of the compensation factors $S_x$ and $S_y$, then the processor proceeds to execute the INSPECT program module illustrated in flow chart form in FIG. 7 in order to actually inspect the pattern 14. To initiate inspection of the pattern 14, the processor 36 supplies the appropriate signals to the stage controller 26 to cause the stage 20 to move the substrate 10 to the deformation-corrected position (step 54).

After the metallized area 12 to be inspected is located in alignment with the camera 32, then the processor 36 acquires the image of that metallized area (step 58). In this regard, the processor 36 converts the analog output signal of the camera 32 into a first set of digital data blocks (bytes), each representing the intensity of a pixel within the matrix array of pixels comprising the image of the metallized area 12 aligned with the camera. The data blocks in the first set are each compared to a separate one of a second set of data blocks, each representing the intensity of a corresponding region of the image of the corresponding metallized area 12' in the master pattern 14' of FIG. 4 (step 58). If there is a substantial match, then the metallized area 12 presently aligned with the camera 32 is deemed to be good. Otherwise, it is deemed to be bad and the pattern 14 is rejected. Following inspection of each metallized area 12, results of the inspection are reported in terms of the degree of the match (step 60). The steps 54–60 are then repeated to inspect each of the other metallized areas 12 within the pattern 14. Rather than report the inspection results after inspecting each metallized area 12, it may be useful to store the results and report them after inspecting the pattern 14.

As may now be better appreciated during inspection of the substrate 10, the COMPENSATE program module is generally performed once at the outset of inspecting a given substrate 10 to compute the requisite compensation factors $S_x$ and $S_y$. Thereafter, the INSPECTION program module is repeatedly executed to inspect successive metallized areas 12 within the pattern 14. Typically, the substrate 10 will have repeated patterns 14 thereon so that after repeated execution of the INSPECTION program module during the inspection of a first pattern 14, the INSPECT program module is then repeatedly executed to inspect the next successive pattern. Once all of the patterns 14 have been inspected on the substrate 10, then the next substrate is loaded on the stage 20, and the entire process is repeated by of first executing the COMPENSATE program module and then repeatedly executing the INSPECTION program module. Generally, it is not necessary to execute the COMPENSATE program module more than once for each substrate 10 under inspection. However, under certain conditions, such as when the patterns on 14 on the substrate 10 are not repeated, it may be desirable to execute the COMPENSATE program prior to inspecting each pattern 14.

The foregoing describes a technique for compensating the pattern 14 for deformation prior to inspecting the pattern for defects. While the technique has been described specifically with respect to inspection of the pattern 14 of metallized areas 12 on a substrate 10, it is applicable for planar, repeatable patterns in general, provided that the pattern geometry is not affected by the deformation. Generally, this is true for a large number of small-sized patterns found in the electronics industry. The technique described herein for pattern compensation can be readily employed for patterns which occupy larger areas, provided that additional points are selected for measuring the pattern deformation, and that the deformation data is interpolated. Moreover, while the technique of compensating the pattern has been described in connection with inspection thereof, there may be other instances when it is desirable to employ the compensation technique of the present invention. For example, the technique can be employed to compute the degree to which the pattern 14 is mis-registered relative to the pattern 14'.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method of inspecting a pattern comprising the steps of:
   (a) capturing the image of each of a plurality of reference points within a pattern with an image-acquisition device;
   (b) establishing the amount of deformation of the pattern from the spacing between the reference points;
   (c) stepping the image-acquisition device between each of a plurality of discrete areas of interest in the pattern by a distance varying in accordance with the pattern deformation to place the image-acquisition device in registration with a successive one of such discrete areas of interest within the pattern;
   (d) capturing the image of a particular discrete area of interest;
   (e) comparing the captured image of the discrete area of interest to the image of the same discrete area within a defect-free master pattern corresponding to the pattern undergoing inspection and reporting if the area of interest in the pattern does not match that in the defect free pattern; and
   (f) repeating steps (c), (d) and (e) until the image acquisition device has been stepped so as to be in registration with each of a predetermined number of the discrete areas of interest in the pattern and the image thereof has been captured and compared to the corresponding area within the master pattern.

2. The method according to claim 1 wherein the amount by which the pattern is deformed is established by the steps of:
   (a) measuring the distance separating each of a pair of the reference points in the pattern;
   (b) establishing the distance separating each of a corresponding pair of reference points in the master pattern; and
   (c) computing the degree of pattern deformation in accordance with the difference between the measured separation between the reference points in the pattern undergoing inspection, and the separation between the corresponding reference points in the master pattern.

3. The method according to claim 1 wherein the steps of (c), (d), (e) and (f) are only carried out if the amount of pattern deformation does not exceed a predetermined value.

4. A method of fabricating a Hybrid Integrated Circuit comprising the steps of:
   printing a pattern of metallized areas on a substrate;
   inspecting the pattern of metallized areas for defects; and
   completing the fabrication of the circuit, if, after inspection of the pattern, no substantial defects are found, wherein the inspection step comprises the steps of
   (a) capturing the image of each of a plurality of reference points within the pattern of metallized areas with an image-acquisition device;
   (b) establishing the amount of deformation of the pattern in accordance with the spacing between pairs of reference points;
   (c) stepping the image-acquisition device between each of a plurality of discrete areas of interest in the pattern by a distance varying in accordance with the pattern deformation to place the image-acquisition device in registration with a successive one of the metallized areas in the pattern;
   (d) capturing the image of the metallized area;
   (e) comparing the captured image of the metallized area to the image of the same metallized area within a defect-free, master pattern corresponding to the pattern of metallized areas undergoing inspection and reporting if the area of interest does not match the corresponding area in the defect free pattern; and
   (f) repeating steps (c), (d) and (e) until the image acquisition device has been stepped so as to be in registration with each of a predetermined number of metallized areas in the pattern and the image thereof has been captured and compared to the corresponding metallized area within the master pattern.

5. The method according to claim 1 wherein the amount by which the pattern is deformed is established by the steps of:
   (a) measuring the distance separating each of a pair of the reference points in the pattern;
   (b) establishing the distance separating each of a corresponding pair of reference points in the master pattern; and
   (c) computing the degree of pattern deformation in accordance with the difference between the measured separation between the reference points in the pattern, and the separation between the corresponding reference points in the master pattern.

* * * * *